(12) United States Patent
Jang et al.

(10) Patent No.: US 9,619,156 B2
(45) Date of Patent: Apr. 11, 2017

(54) STORAGE DEVICE, MEMORY CARD, AND COMMUNICATING METHOD OF STORAGE DEVICE

(71) Applicants: Jinsic Jang, Asan-si (KR); Kihyun Park, Seoul (KR)

(72) Inventors: Jinsic Jang, Asan-si (KR); Kihyun Park, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/795,640

(22) Filed: Jul. 9, 2015

(65) Prior Publication Data

US 2016/0034203 A1 Feb. 4, 2016

Related U.S. Application Data

(60) Provisional application No. 62/031,299, filed on Jul. 31, 2014.

(30) Foreign Application Priority Data

Sep. 23, 2014 (KR) .................. 10-2014-0126731

(51) Int. Cl.
| | |
|---|---|
| *G06F 13/10* | (2006.01) |
| *G06F 3/06* | (2006.01) |
| *G06F 13/42* | (2006.01) |
| *G06F 9/44* | (2006.01) |

(52) U.S. Cl.
CPC .......... *G06F 3/0611* (2013.01); *G06F 3/0634* (2013.01); *G06F 3/0661* (2013.01); *G06F 3/0679* (2013.01); *G06F 9/4418* (2013.01); *G06F 13/4256* (2013.01); *G06F 9/4411* (2013.01)

(58) Field of Classification Search
CPC ....... G06F 13/10; G06F 3/0634; G06F 13/385
See application file for complete search history.

(56) References Cited

U.S. PATENT DOCUMENTS

| | | |
|---|---|---|
| 7,370,168 B2 | 5/2008 | Kanamori et al. |
| 7,415,647 B2 | 8/2008 | Yee |
| 7,679,391 B2 | 3/2010 | Watanabe et al. |
| 8,453,939 B2 | 6/2013 | Lee |
| 8,484,394 B2 | 7/2013 | Hubo et al. |

(Continued)

FOREIGN PATENT DOCUMENTS

| | | |
|---|---|---|
| JP | 2003030613 A | 1/2003 |
| KR | 1020130012628 A | 2/2013 |

*Primary Examiner* — Farley Abad
(74) *Attorney, Agent, or Firm* — Harness, Dickey & Pierce, PLC

(57) ABSTRACT

A storage device includes a host interface configured to communicate with a host device according to a first protocol through an input terminal, an output terminal, and a clock terminal. The input terminal is configured to receive an input signal from the host device according to the first protocol. The output terminal is configured to output an output signal to the host device according to the first protocol. The clock terminal configured to receive a clock signal from the host device according to the first protocol. The host interface is configured to communicate with the host device according to a second protocol through the clock terminal, the second protocol being different from the first protocol.

18 Claims, 12 Drawing Sheets

| Clk Mode | Assignment | |
|---|---|---|
| M1 | Entry to Second Mode | |
| M2 | Code | Digital bit "1" |
| M3 | | Digital bit "0" |
| M4 | Execution | |

(56) References Cited

U.S. PATENT DOCUMENTS

| | | |
|---|---|---|
| 8,621,292 B2 | 12/2013 | Kim |
| 2002/0163834 A1* | 11/2002 | Scheuerlein ............ G11C 5/025 |
| | | 365/185.17 |
| 2004/0215996 A1* | 10/2004 | Kanamori .............. G11C 29/02 |
| | | 713/600 |
| 2007/0255984 A1 | 11/2007 | Yee |
| 2009/0300239 A1 | 12/2009 | Hubo et al. |
| 2010/0007366 A1 | 1/2010 | Watanabe et al. |
| 2011/0072185 A1* | 3/2011 | Pinto ..................... G06F 3/0607 |
| | | 710/315 |
| 2012/0024964 A1 | 2/2012 | Lee |
| 2012/0191996 A1 | 7/2012 | Cheong |
| 2012/0266008 A1* | 10/2012 | Coteus ...................... G06F 1/10 |
| | | 713/400 |
| 2012/0317449 A1 | 12/2012 | Kim |
| 2013/0024585 A1* | 1/2013 | Takahashi ........... G06F 13/4291 |
| | | 710/74 |
| 2013/0198544 A1 | 8/2013 | Ju et al. |
| 2014/0047288 A1 | 2/2014 | Lee et al. |

* cited by examiner

| Clk Mode | Assignment | |
|---|---|---|
| M1 | Entry to Second Mode | |
| M2 | Code | Digital bit "1" |
| M3 | | Digital bit "0" |
| M4 | Execution | |

STORAGE DEVICE, MEMORY CARD, AND COMMUNICATING METHOD OF STORAGE DEVICE

CROSS-REFERENCE TO RELATED APPLICATIONS

A claim for priority under 35 U.S.C. §119 is made to Korean Patent Application No. 10-2014-0126731 filed on Sep. 23, 2014, in the Korean Intellectual Property Office, and U.S. provisional patent application No. 62/031,299, filed on Jul. 31, 2014, the entire contents of each of which are hereby incorporated by reference.

BACKGROUND

Inventive concepts relate to a storage device, and more particularly, to a storage device, a memory card, and/or a communicating method of the storage device.

A semiconductor memory device is a memory device, which is fabricated using semiconductors, such as silicon (Si), germanium (Ge), gallium arsenide (GaAs), and indium phosphide (InP). Semiconductor memory devices are classified into volatile memory devices and nonvolatile memory devices.

The volatile memory devices may lose stored contents if powered-off. The volatile memory devices include a static random access memory (SRAM), a dynamic RAM (DRAM), and a synchronous DRAM (SDRAM). The nonvolatile memory devices may retain stored contents even if powered-off. The nonvolatile memory devices include the following: a read only memory (ROM), a programmable ROM (PROM), an electrically programmable ROM (EPROM), an electrically erasable and programmable ROM (EEPROM), a flash memory device, a phase-change RAM (PRAM), a magnetoresistive RAM (MRAM), a resistive RAM (RRAM), and a ferroelectric RAM (FRAM or FeRAM).

A nonvolatile memory may be used as storage of a computing device. The nonvolatile memory may be used to form a solid state drive (SSD) to be used in connection with a computer, embedded storage to be used in connection with a mobile device, and a detachable memory card detachable from a computer or a mobile device.

SUMMARY

According to at least one example embodiment, a storage device includes a host interface configured to communicate with a host device according to a first protocol through an input terminal, an output terminal, and a clock terminal. The input terminal is configured to receive an input signal from the host device according to the first protocol. The output terminal is configured to output an output signal to the host device according to the first protocol. The clock terminal configured to receive a clock signal from the host device according to the first protocol. The host interface is configured to communicate with the host device according to a second protocol through the clock terminal, the second protocol being different from the first protocol.

According to at least one example embodiment, the first protocol is a Universal Flash Storage (UFS) protocol.

According to at least one example embodiment, the host interface is configured to communicate with the host device according to the first protocol in a first mode, and communicate with the host device according to the second protocol in a second mode.

According to at least one example embodiment, the input terminal is deactivated in the second mode.

According to at least one example embodiment, in the second mode, the clock signal is based on the second protocol, and the host interface is configured to receive the clock signal based on the second protocol through the clock terminal and output the output signal based on the second protocol through the output terminal.

According to at least one example embodiment, the storage device includes a clock decoder configured to, in the second mode, analyze at least one command set of the clock signal that is based on the second protocol to identify a clock mode of a segment.

According to at least one example embodiment, the segment includes a plurality of pulses, and the clock decoder is configured to determine a length of the segment and the clock mode based on pulse widths of the pulses.

According to at least one example embodiment, the clock mode includes a first clock mode associated with a command informing an entry into the second mode, a second clock mode corresponding to a first bit of a code indicating an operation to be executed in the second mode, a third clock mode corresponding to a second bit of the code different from the first bit, and a fourth clock mode associated with a command directing execution of the operation indicated by the code.

According to at least one example embodiment, after entering the second mode, the host interface is configured to set the output terminal to a hibernate state until the operation is executed. After the operation is executed, the host interface is configured to control the output terminal to maintain the hibernate state or have one of a positive state and a negative state depending on a result of the execution.

According to at least one example embodiment, the host interface is configured to pull-up the output terminal in the hibernate state.

According to at least one example embodiment, the output terminal includes a first output terminal and a second output terminal which output complementary signals, and if the output terminal is controlled to have the positive state or the negative state, the host interface is configured to perform second protocol-based communications through whichever one of the first output terminal and the second output terminal has a low state.

According to at least one example embodiment, the host interface includes a physical layer having the clock decoder.

According to at least one example embodiment, the storage device is implemented as a memory card.

According to at least one example embodiment, a method of performing communications between a storage device that supports a first protocol and a host device that supports a second protocol includes providing the clock terminal with a clock signal based on the second protocol such that the clock signal has at least one command set; and outputting a result of an operation corresponding to the command set to the output terminal.

According to at least one example embodiment, the method includes changing from a first mode in which the storage device communicates with the host device according to the first protocol to a second mode in which the storage device communicates with the host device according to the second protocol, and executing the operation corresponding to the command set.

According to at least one example embodiment, the operation corresponding to the command set includes at least one of firmware downloading, memory test, BIST (Built-in self-test), and identification about an internal state of a memory controller for debugging.

According to at least one example embodiment, the output terminal is controlled to have a hibernate state until the result of the operation corresponding to the command set is output, and depending on an execution result of the operation corresponding to the command set, the output terminal maintains the hibernate state or is set to one of a positive state and a negative state.

According to at least one example embodiment, the first protocol is a Universal Flash Storage (UFS) protocol.

According to at least one example embodiment, a memory card includes a nonvolatile memory and a memory controller. The memory controller is configured to control the nonvolatile memory by operating in a first mode or a second mode, the first mode being a mode in which communications with a host device supporting a first protocol are made in compliance with the first protocol, the second mode being a mode in which communications with a host device not supporting the first protocol are made in compliance with a second protocol, different from the first protocol. The memory controller includes a host interface configured to perform first protocol-based communications, an output terminal configured to output an output signal based on the second protocol in the second mode, and a clock terminal configured to receive a clock signal that is based on the second protocol in the second mode.

According to at least one example embodiment, the memory controller further comprises an input terminal that is deactivated in the second mode.

According to at least one example embodiment, the nonvolatile memory is a flash memory including a three dimensional memory array.

According to at least one example embodiment, a storage device includes a memory controller including an input terminal and a clock terminal. The memory controller is configured to operate in one of a first mode and a second mode based on a communication protocol of the host device. The first mode is a mode in which the memory controller receives first commands from the host device through an input signal at the input terminal according to a first communication protocol, and the second mode being a mode in which the memory controller receives second commands from the host device through a clock signal at the clock terminal according to a second communication protocol, different from the first communication protocol.

According to at least one example embodiment, the memory controller is configured to enter the first mode if the communication protocol of the host device is the first communication protocol, and enter the second mode if the communication protocol of the host device is the second protocol.

According to at least one example embodiment, the memory controller includes a decoder configured to, in the second mode, determine the second commands by analyzing pulse widths of pulses in a segment of the clock signal.

According to at least one example embodiment, the pulse widths indicate a plurality of clock modes. The plurality of clock modes includes a first clock mode associated with a command informing an entry into the second mode, a second clock mode corresponding to a first bit of a code indicating an operation to be executed in the second mode, a third clock mode corresponding to a second bit of the code different from the first bit, and a fourth clock mode associated with a command directing execution of the operation indicated by the code.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION OF EXAMPLE EMBODIMENTS

Figure 1:
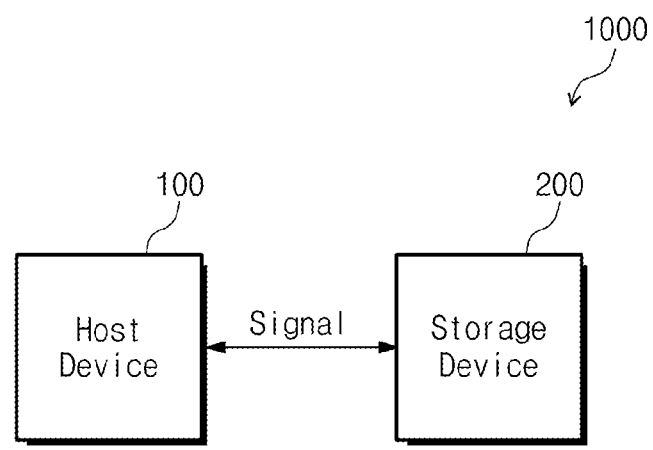
FIG. 1 is a block diagram schematically illustrating a memory system according to at least one example embodiment of inventive concepts.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

In example embodiments, a nonvolatile memory may be embodied to include a three dimensional (3D) memory array. The 3D memory array may be monolithically formed on a substrate (e.g., semiconductor substrate such as silicon, or semiconductor-on-insulator substrate). The 3D memory array may include two or more physical levels of memory cells having an active area disposed above the substrate and circuitry associated with the operation of those memory cells, whether such associated circuitry is above or within such substrate. The layers of each level of the array may be directly deposited on the layers of each underlying level of the array.

In example embodiments, the 3D memory array may include vertical NAND strings that are vertically oriented such that at least one memory cell is located over another memory cell. The at least one memory cell may comprise a charge trap layer.

The following patent documents, which are hereby incorporated by reference in their entirety, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

FIG. 1 is a block diagram schematically illustrating a memory system 1000 according to at least one example embodiment of inventive concepts. Referring to FIG. 1, a memory system 1000 contains a host device 100 and a storage device 200.

The host device 100 may be automated test equipment (ATE) for testing the storage device 200. The host device 100 communicates with the storage device 200. The host device 100 issues a signal for testing the storage device 200 and receives a test result from the storage device 200.

The host device 100 may support a protocol different from a host interface of the storage device 200. This will be more fully described later. Meanwhile, the host device 100 is not limited to ATE. For example, the host device 100 may be implemented with various devices capable of supporting a protocol different from the storage device 200.

The storage device 200 communicates with the host device 100 to conduct an operation based on a control of the host device 100. The storage device 200 may include nonvolatile memories, such as a flash memory, a PRAM, an MRAM, and an RRAM. In exemplary embodiments, the storage device 200 may be a detachable memory card which is connected to or detached from the host device 100.

In general, communications between the host device 100 and the storage device 200 are made through the same interface manner. In the memory system 1000 according to at least one example embodiment of inventive concepts, however, the storage device 200 supports a first protocol, while the host device 100 does not support the first protocol. Nevertheless, communications between the host device 100 and the storage device 200 may be performed depending on a second protocol different from the first protocol. Below, an example embodiment of inventive concepts will be exemplified as the host device 100 does not support the first protocol.

Figure 2:
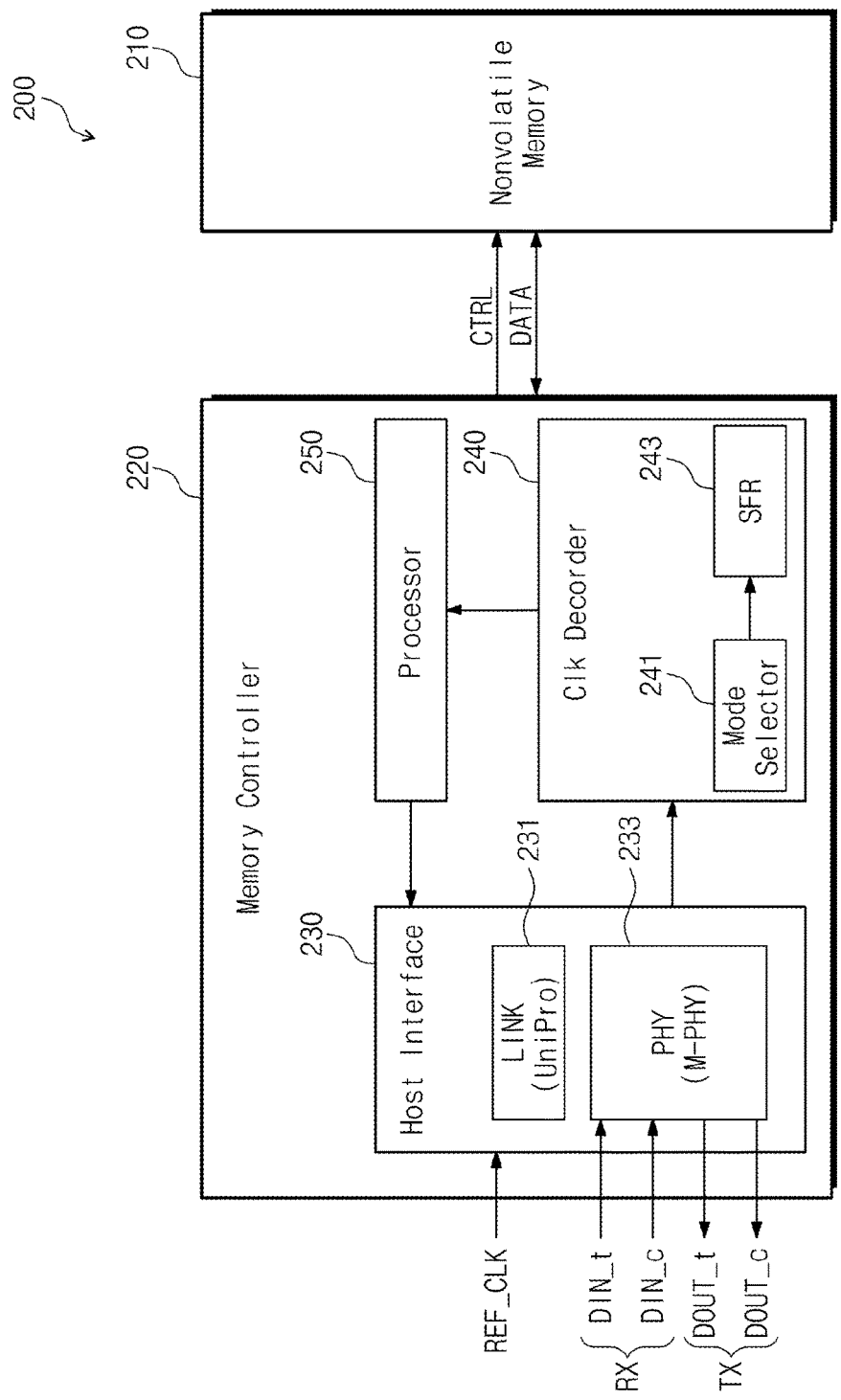
FIG. 2 is a block diagram schematically illustrating a storage device according to at least one example embodiment of inventive concepts.

FIG. 2 is a block diagram schematically illustrating a storage device 200 according to at least one example embodiment of inventive concepts. Referring to FIGS. 1 and 2, a storage device 200 contains a nonvolatile memory 210 and a memory controller 220.

The nonvolatile memory 210 performs a read, a write, and an erase operation in response to a control of the memory controller 220. The nonvolatile memory 210 may include a NAND flash memory. However, the scope and spirit of inventive concepts are not limited thereto. For example, the nonvolatile memory 210 may include at least one of nonvolatile memories, such as a PRAM, an MRAM, an RRAM, and a FeRAM.

The memory controller 220 is configured to control the nonvolatile memory 210 in response to a request of the host device 100. The memory controller 220 issues a control signal CTRL to the nonvolatile memory 210 and exchanges data DATA with the nonvolatile memory 210.

The memory controller 220 operates in a first mode or a second mode. The first mode is a mode where communications with a host device which supports a first protocol are performed according to the first protocol, and the second mode is a mode where communications with a host device which does not support the first protocol are performed according to a second protocol different from the first protocol.

The memory controller 220 contains a host interface 230, a clock decoder 240, and a processor 250.

The host interface 230 manages communications between the memory controller 220 and a host device 100 in compliance with the first protocol. In at least one example embodiment, the first protocol may be a UFS (Universal Flash Storage) protocol. The host interface 230 may interface with a host device supporting the UFS protocol. In other words, the host interface 230 does not interface with the host device 100 that does not support the UFS protocol. However, the scope and spirit of inventive concepts are not limited thereto. The host interface 230 may interface with a host device supporting the same interface protocol by means of various interface protocols, such as USB (Universal Serial Bus), MMC (Man Machine Communication), PCI-E (Peripheral Component Interconnect-Express), SATA (Serial Advanced Technology Attachment), PATA (Parallel Advanced Technology Attachment), SCSI (Small Computer System Interface), ESDI (Enhanced Small Device Interface), and IDE (Intelligent Drive Electronics).

The host interface 230 includes a link layer 231 and a physical layer 233.

The link layer 231 generates an output signal in compliance with the UFS protocol and receives a reception signal. The link layer 231 may include the following of OSI (Open Systems Interconnection) layers: a physical adaptor layer L1.5, a data link layer part L2, a network layer L3, and a transport layer L4. The link layer 231 may form a DEM (Device Management Entity). The link layer 231 may include MIPI (Mobile Industry Processor Interface) Unipro.

The physical layer 233 transmits an output signal in compliance with the UFS protocol and receives a reception signal. The physical layer 233 may include a physical layer L1 of the OSI layers. The physical layer 233 may contain MIPI M-PHY.

The host interface 230 contains an output terminal TX, an input terminal RX, and a clock terminal REF_CLK.

The physical layer 233 transmits a signal to the host device 100 through the output terminal TX. The output terminal TX is connected to a reception pad of the host device 100 to form a channel. In the first mode, the output terminal TX is set to output an output signal that is based on the first protocol.

The output terminal TX contains a first output terminal DOUT_t and a second output terminal DOUT_c. The first output terminal DOUT_t and the second output terminal DOUT_c. may be controlled to have one of at least three states. For example, the first output terminal DOUT_t and the second output terminal DOUT_c may be controlled to have one of a positive state DIF-P, a negative state DIF-N, and a hibernate state HIBERN8.

When a level (e.g., a voltage level) of a first output signal on the first output terminal DOUT_t is higher than a level of a second output signal on the second output terminal DOUT_c, the first output terminal DOUT_t and the second output terminal DOUT_c may be at the positive state DIF-P. When a level (e.g., a voltage level) of the first output signal on the first output terminal DOUT_t is lower than a level of the second output signal on the second output terminal DOUT_c, the first output terminal DOUT_t and the second output terminal DOUT_c may be at the negative state DIF-N. When the first output terminal DOUT_t and the second output terminal DOUT_c are floated or at a same level, the first output terminal DOUT_t and the second output terminal DOUT_c may be at the hibernate state HIBERN8.

In the first mode, the host interface 230 is connected to a host device supporting the UFS protocol and transmits information by means of the positive state DIF-P of the first output terminal DOUT_t and the negative state DIF-N of the second output terminal DOUT_c. That is, the host interface 230 transfers information by complementarily sending the first output signal of the first output terminal DOUT_t and the second output signal of the second output terminal DOUT_c.

In the second mode, the host interface 230 is connected to the host device 100 not supporting the UFS protocol and does not output information through the first and second output terminals DOUT_t and DOUT_c in compliance with the UFS protocol. In the second mode, the memory controller 220 outputs information to the host device 100 through one of the first and second output terminals DOUT_t and DOUT_c according to a second protocol that is not the UFS protocol.

The physical layer 233 receives a signal applied to the host device 100 through the input terminal RX. The input terminal RX is connected to an output terminal of the host device 100 to form a channel. In the first mode, the input terminal RX is set to receive an input signal that is based on the first protocol.

The input terminal RX contains a first input terminal DIN_t and a second input terminal DIN_c. The first input terminal DIN_t and the second input terminal DIN_c. may be controlled to have one of at least three states. For example, the first input terminal DIN_t and the second input terminal DIN_c may be controlled to have one of the positive state DIF-P, the negative state DIF-N, and the hibernate state HIBERN8.

When a level (e.g., a voltage level) of a first input signal on the first input terminal DIN_t is higher than a level of a second input signal on the second input terminal DIN_c, the first input terminal DIN_t and the second input terminal DIN_c may be at the positive state DIF-P. When a level (e.g., a voltage level) of the first input signal on the first input terminal DIN_t is lower than a level of the second input signal on the second input terminal DIN_c, the first input terminal DIN_t and the second input terminal DIN_c may be at the negative state DIF-N. When the first input terminal DIN_t and the second input terminal DIN_c are floated or at a same level, the first input terminal DIN_t and the second input terminal DIN_c may be at the hibernate state HIBERN8.

In the first mode, the host interface 230 is connected to a host device supporting the UFS protocol and identifies information based on the positive state DIF-P of the first input terminal DIN_t and the negative state DIF-N of the second input terminal DIN_c. That is, the host interface 230 identifies information by complementarily receiving the first input signal of the first input terminal DIN_t and the second input signal of the second input terminal DIN_c.

In the second mode, the host interface 230 is connected to the host device 100 not supporting the UFS protocol and does not identify information, which is based on the UFS protocol, through the first and second input terminals DIN_t and DIN_c. In the second mode, the memory controller 220 does not receive a second protocol-based signal through the first and second input terminals DIN_t and DIN_c. In detail, the memory controller 220 receives a second protocol-based signal through the clock terminal REF_CLK.

In the first mode, the host interface 230 receives a first clock signal, which is based on the first protocol, through the clock terminal REF_CLK. In the second mode, the host interface 230 receives a second clock signal, which is based on the second protocol, through the clock terminal REF_CLK.

In at least one example embodiment, the first protocol may be the UFS protocol. According to the UFS specification, the clock terminal REF_CLK receives a reference clock or is pulled down to be deactivated. That is, according to the UFS protocol, during deactivation of the clock terminal REF_CLK, the memory controller 220 may operate in the second mode and receive the second clock signal.

The host interface 230 receives the second clock signal, which is based on the second protocol, through the clock terminal REF_CLK, not the first and second input terminals DIN_t and DIN_c. In compliance with the UFS specification, signals applied to the first and second input terminals DIN_t and DIN_c have the swing amplitude ranging from 200 mV to 400 mV. In contrast, a signal applied to the clock terminal REF_CLK has the 1.2-V swing amplitude. That is, the voltage swing amplitude of signals applied to the first and second input terminals DIN_t and DIN_c is smaller than that of a signal applied to the clock terminal REF_CLK. Therefore, the signals applied to the first and second input terminals DIN_t and DIN_c are not appropriate to receive the second protocol-based signal. Further, in compliance with the UFS specification, a frequency of signals applied to the first and second input terminals DIN_t and DIN_c is higher than that of a signal applied to the clock terminal REF_CLK. Therefore, the signals applied to the first and second input terminals DIN_t and DIN_c are not appropriate to receive the second protocol-based signal.

Although not shown in figure, the host interface 230 may further include a power terminal. The power terminal may be supplied with a power from the host device 100.

The clock decoder 240 receives the second clock signal from the host interface 230. In detail, the physical layer 233 transmits the second clock signal to the clock decoder 240. The clock decoder 240 decodes the second clock signal in compliance with the second protocol and stores the decoded result.

The clock decoder 240 contains a mode selector 241 and a special function register (SFR) 243.

The mode selector 241 analyzes the second clock signal by the segment. The second clock signal includes a plurality of segments, each of which has information about one of a plurality of clock modes.

In at least one example embodiment, it may be assumed that each segment has information about one of, for example, first through fourth clock modes. The mode selector 241 identifies each segment of the second clock signal as one of the first through fourth clock modes. However, the scope and spirit of inventive concepts are not limited thereto. For example, each segment may have information about one of five or more clock modes. This will be more fully described with reference to FIG. 3.

The SFR 243 stores clock mode information of each segment identified by the mode selector 241. Pieces of clock mode information of segments may constitute a command set.

The processor 250 controls an overall operation of the memory controller 220 and conducts a logical operation. When the memory controller 220 operates in the second mode, the processor 250 performs an operation corresponding to a command set that the SFR 243 stores. The processor 250 provides the result of performing the operation corresponding to the command set to the host device 100 through one of the first output terminal DOUT_t and the second output terminal DOUT_c. For example, when the command set indicates a test of the nonvolatile memory 210, the processor 250 tests the nonvolatile memory 210 according to the command set and outputs the test result (indicating whether the nonvolatile memory 210 is defective) through one of the first output terminal DOUT_t and the second output terminal DOUT_c.

Even though the host device 100 does not support the first protocol, it is possible to recognize whether an operation corresponding to a command set is successful, depending on a state of one of the first output terminal DOUT_t and the second output terminal DOUT_c.

The processor 250 may be implemented with firmware and a microprocessor chip. In some cases, the processor 250 may be implemented with firmware without the microprocessor chip.

Figure 3:
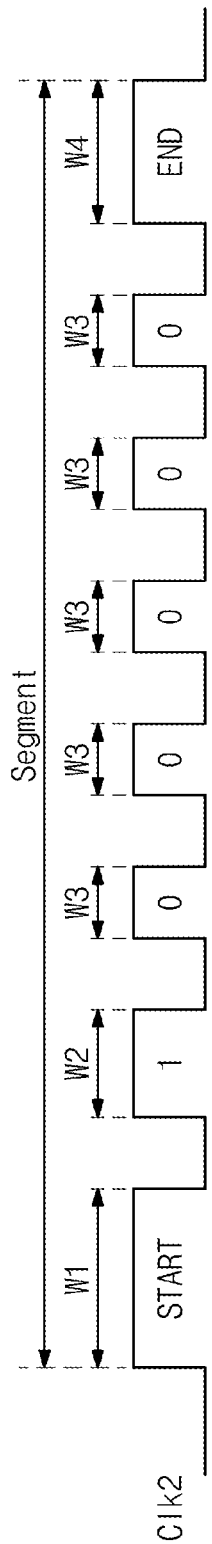
FIG. 3 is a diagram showing one segment of a second clock according to at least one example embodiment of inventive concepts.

FIG. 3 is a diagram showing one segment of a second clock Clk2 according to at least one example embodiment of inventive concepts. Segments of a second clock signal Clk2 have the same shape except for clock mode information. One segment will be more fully described with reference to FIG. 3.

Referring to FIG. 3, each segment of the second clock signal Clk2 is formed of a plurality of pulses. The pulses of each segment have first through fourth pulse widths W1 through W4 that are different from one another. Each segment contains its length and information about a clock mode by means of the pulse widths W1 through W4 of the pulses.

For example, a pulse having the first pulse width W1 means a start of the segment, and a pulse having the fourth pulse width W4 means an end of the segment. The length of each segment is defined by a rising edge of a pulse having the first pulse width W1 and a falling edge of a pulse having the fourth pulse width W4.

A pulse having the second pulse width W2 corresponds to digital bit "1" and a pulse having the third pulse width W3 to digital bit "0". A clock mode of each segment is determined by a combination of a pulse of the second pulse width W2 and a pulse of the third pulse width W3.

Figures 4, 5:
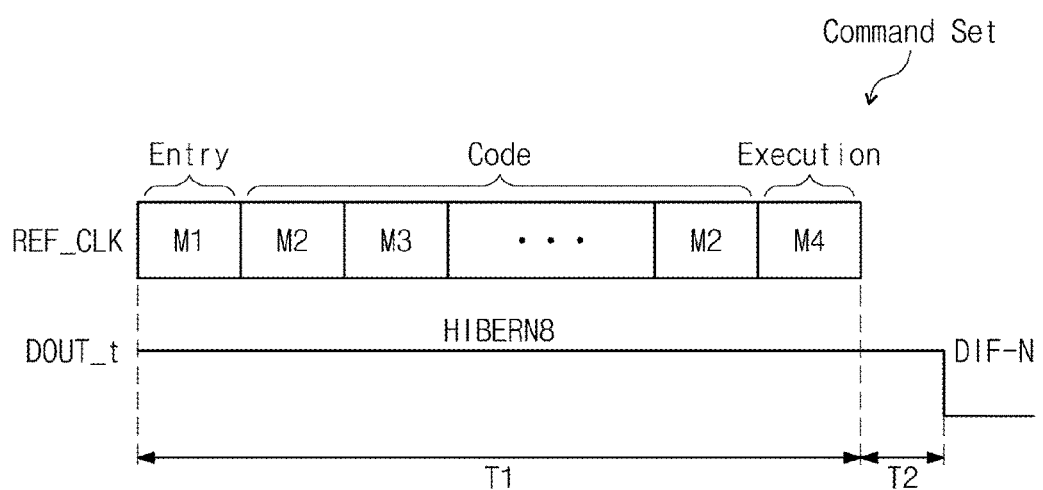
FIG. 4 is a diagram functions assigned to clock modes of a segment in compliance with a second protocol.
FIG. 5 is a diagram showing a signal applied to a clock terminal and a signal output from a first output terminal, according to at least one example embodiment of inventive concepts.

FIG. 4 is a diagram functions assigned to clock modes of a segment in compliance with a second protocol.

Referring to FIGS. 1, 2, and 4, a command directing a memory controller 220 to enter a second mode is assigned to a first clock mode M1 of a segment. When the first clock mode M1 is identified, the memory controller 220 enters the second mode. In the second mode, the memory controller 220 prepares to communicate with a host device 100 and deactivates first protocol-based communication.

A code indicating an operation to be executed by the memory controller 220 in a second mode is assigned to second and third clock modes M2 and M3. The second clock mode M2 is set with digital bit "1", and the third clock mode M3 is set with digital bit "0". A variety of codes may be generated by a combination of the second and third clock modes M2 and M3. A code length may be variously changed.

An executable operation of the memory controller 220 that a code indicates may include firmware downloading, memory test, BIST (Built-in self-test), and identification about an internal status of a memory controller for debugging.

Assigned to the fourth clock mode M4 is a command directing the memory controller 220 to execute an operation corresponding to a code. When the fourth clock mode M4 is identified, the memory controller 220 executes an operation corresponding to a code and outputs the execution result to a host device 100.

FIG. 5 is a diagram showing a signal applied to a clock terminal and a signal output from a first output terminal, according to at least one example embodiment of inventive concepts.

In FIG. 5, an example embodiment of inventive concepts is exemplified as a second clock signal having one command set that is applied to a clock terminal REF_CLK. FIG. 5 shows an example embodiment where a memory controller 220 outputs a result of performing an operation corresponding to a command set through a first output terminal DOUT_t. However, the scope and spirit of inventive concepts are not limited thereto. For example, the memory controller 220 may output a result of performing an operation corresponding to a command set through a second output terminal DOUT_c.

Referring to FIGS. 1, 2, and 5, during T1, the memory controller 220 receives a command set, which is based on a second protocol, from a host device 220 through a clock terminal REF_CLK. During T1, a clock decoder 240 decodes the command set. Also, a processor 250 enters a second mode in compliance with a first clock mode M1 during T1.

During T1, an output terminal TX is at a hibernate state HIBERN8. The processor 250 controls a host interface 230 such that the output terminal TX is set to the hibernate state HIBERN8. The output terminal TX is connected to a pull-up circuit and is pulled up at the hibernate state HIBERN8. The pull-up circuit may contain a resistor and a voltage source that are connected in series. That is, a first output terminal DOUT_t may be pulled up during T1.

After T1 passes, the processor 250 performs an operation, which corresponds to a code defined by a combination of second and third clock modes M2 and M3, in response to a command of a fourth clock mode M4.

After T1 ends and T2 passes, the processor 250 outputs a result of performing the operation corresponding to the command set through the first output terminal DOUT_t. The output terminal TX remains at the hibernate state HIBERN8 during T2. In some cases, T2 may be omitted.

When the operation corresponding to the command set is passed after T1 and T2, the processor 250 controls the host interface 230 such that the output terminal TX has one of a negative state DIF-N and a positive state DIF-P. When the operation corresponding to the command set fails, the processor 250 controls the host interface 230 such that the output terminal TX maintains the hibernate state HIBERN8.

The first output terminal DOUT_t has a low state when the output terminal TX has the negative state DIF-N. A second output terminal DOUT_c has a low state when the output terminal TX has the positive state DIF-P.

When the output terminal TX is set to the positive state DIF-P or the negative state DIF-N, the memory controller 220 conducts second protocol-based communications with the host device 100 through whichever one of the first and second output terminals DOUT_t and DOUT_c has a low state. In FIG. 5, an example embodiment of inventive concepts is exemplified as the first output terminal DOUT_t has a pull-up (high) state during T1 and T2 and then has a low state after T1 and T2 pass.

After T1 and T2 pass, the host device 100 checks a state of the first output terminal DOUT_t to determine whether an operation corresponding to a command set succeeds.

Meanwhile, an input terminal RX may remain at the hibernate state HIBERN8 while the memory controller 220 operates in a second mode.

In a storage device 200 according to at least one example embodiment of inventive concepts, even though the host device 100 does not support the first protocol, the host device 100 performs second protocol-based communications with the host device 100 through the clock terminal REF_CLK and the output terminal TX.

Figure 6:
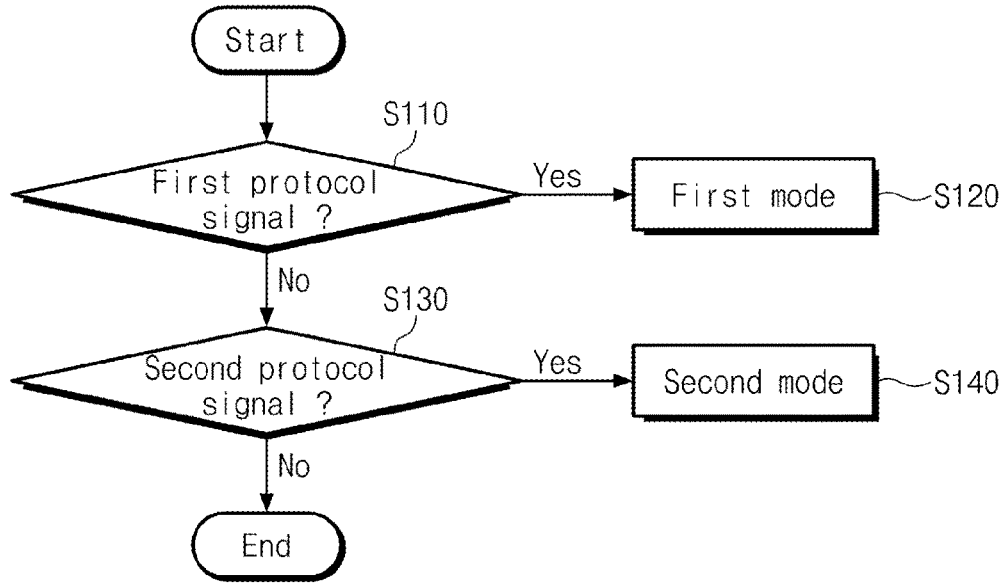
FIG. 6 is a flow chart showing an operating method of a storage device according to at least one example embodiment of inventive concepts.

FIG. 6 is a flow chart showing an operating method of a storage device 200 according to at least one example embodiment of inventive concepts.

Referring to FIGS. 1, 2, and 6, a host interface 230 supports a first protocol, and a storage device 200 supports the first protocol or does not support the first protocol.

In step S110, a memory controller 220 determines whether a signal received from the host device 100 (e.g., at the clock terminal) is based on the first protocol. As a consequence of determining that the signal received from the host device 100 is based on the first protocol, in step S120, the memory controller 220 operates in a first mode. The first protocol-based signal is received through an input terminal RX and a clock terminal REF_CLK. In the first mode, the host interface 230 executes first protocol-based communications with the host device 100.

When not supporting the first protocol, the host device 100 does not provide the storage device 200 with the first protocol-based signal. As a consequence of determining that the signal received from the host device 100 is not based on the first protocol, in step S130, the memory controller 220 determines whether a signal received from the host device 100 (e.g., at the clock terminal) is based on a second protocol.

As a consequence of determining that the signal received from the host device 100 is based on the second protocol, in step S140, the memory controller 220 operates in a second mode. The second protocol-based signal is received through a clock terminal REF_CLK. In the second mode, the memory controller 220 executes second protocol-based communications with the host device 100.

Meanwhile, prior to step S110, the storage device 200 may execute a power-on reset (POR) operation. The host interface 230 may execute the power-on reset (POR) operation when a power is supplied to the storage device 200 from the host device 100. The host interface 230 is initialized when the POR operation is performed.

Figure 7:
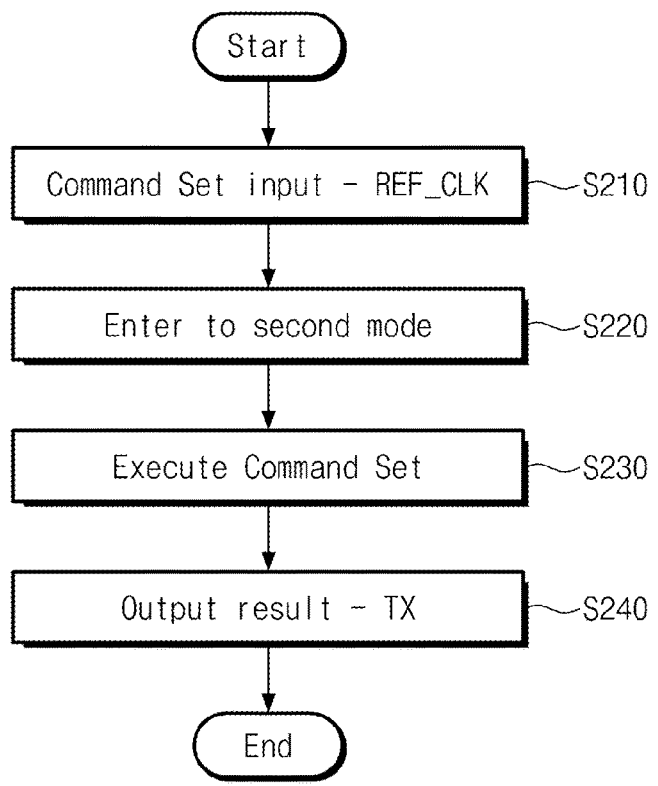
FIG. 7 is a flow chart showing step S140 of FIG. 6.

FIG. 7 is a flow chart showing step S140 of FIG. 6. It is assumed that a host device 100 does not support a first protocol. Referring to FIGS. 1, 2, and 7, in step S210, a clock decoder 240 decodes a signal applied to a clock terminal REF_CLK in compliance with a second protocol and stores a command set as the decoding result. The command set is formed of a plurality of clock modes. Each clock mode or a combination of clock modes may at least direct entry, code, and execution. A mode selector 241 analyzes the clock modes and stores the analyzed clock modes at an SFR 243.

In step S220, a memory controller 220 enters a second mode in response to an entry command of the command set. When entering the second mode, the memory controller 220 prepares to conduct second protocol-based communications with a host device 100 and deactivates first protocol-based communications.

In step S230, the memory controller 220 executes an operation, corresponding to a code of the command set, in response to an execution command of the command set. A processor 250 executes an operation that the code denotes.

In step S240, the memory controller 220 outputs a result of the executed operation through the output terminal TX. The processor 250 executes an operation corresponding to the code and outputs the executed result through the output terminal TX.

Figure 8:
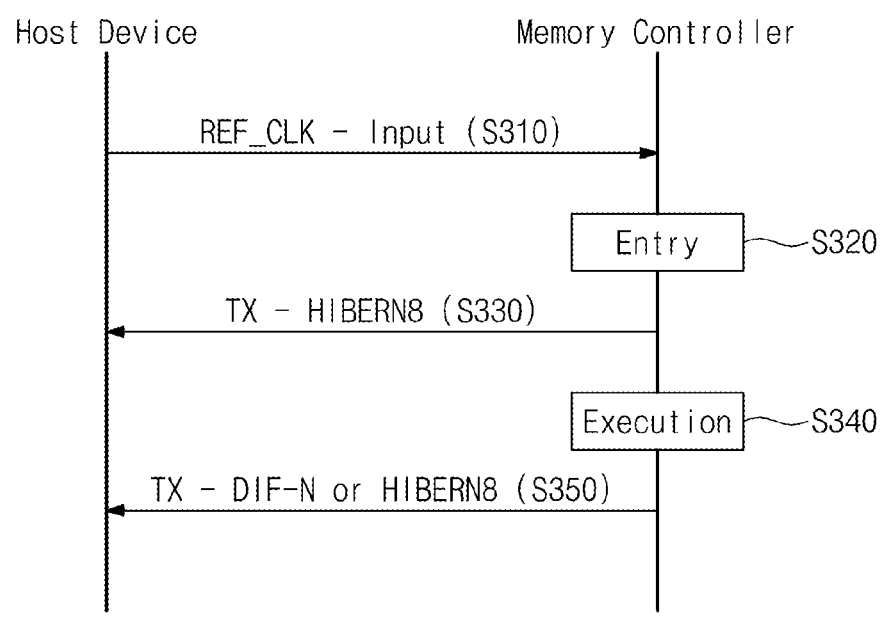
FIG. 8 is a flow chart showing second protocol-based communications between a host device and a memory controller, according to at least one example embodiment of inventive concepts.

FIG. 8 is a flow chart showing second protocol-based communications between a host device 100 and a memory controller 220, according to at least one example embodiment of inventive concepts.

Referring to FIGS. 1, 2, and 8, in step S310, a host device 100 sends a second protocol-based signal to a storage device 200. The second protocol-based signal may be received through a clock terminal REF_CLK. If the second protocol-based signal is received through the clock terminal REF_CLK, in step S320, a memory controller 220 enters a second mode.

After the memory controller 220 enters the second mode, in step S330, an output terminal TX is set to a hibernate state HIBERN8 under a control of a host interface 230. Also, an input terminal RX is set to the hibernate state HIBERN8 under a control of a host interface 230.

In step S340, the memory controller 220 executes an operation that a code of a command set denotes. In step S350, the host interface 230 outputs a result of performing the operation, which the code of the command set denotes, through the output terminal TX. For example, when the executed operation succeeds, the host interface 230 sets the output terminal TX to a negative state DIF-N. When the executed operation fails, the output terminal TX maintains the hibernate state HIBERN8 under a control of the host interface 230. The host device 100 checks a signal output through a first output terminal DOUT_t to determine whether an operation corresponding to the command set succeeds.

Figure 9:
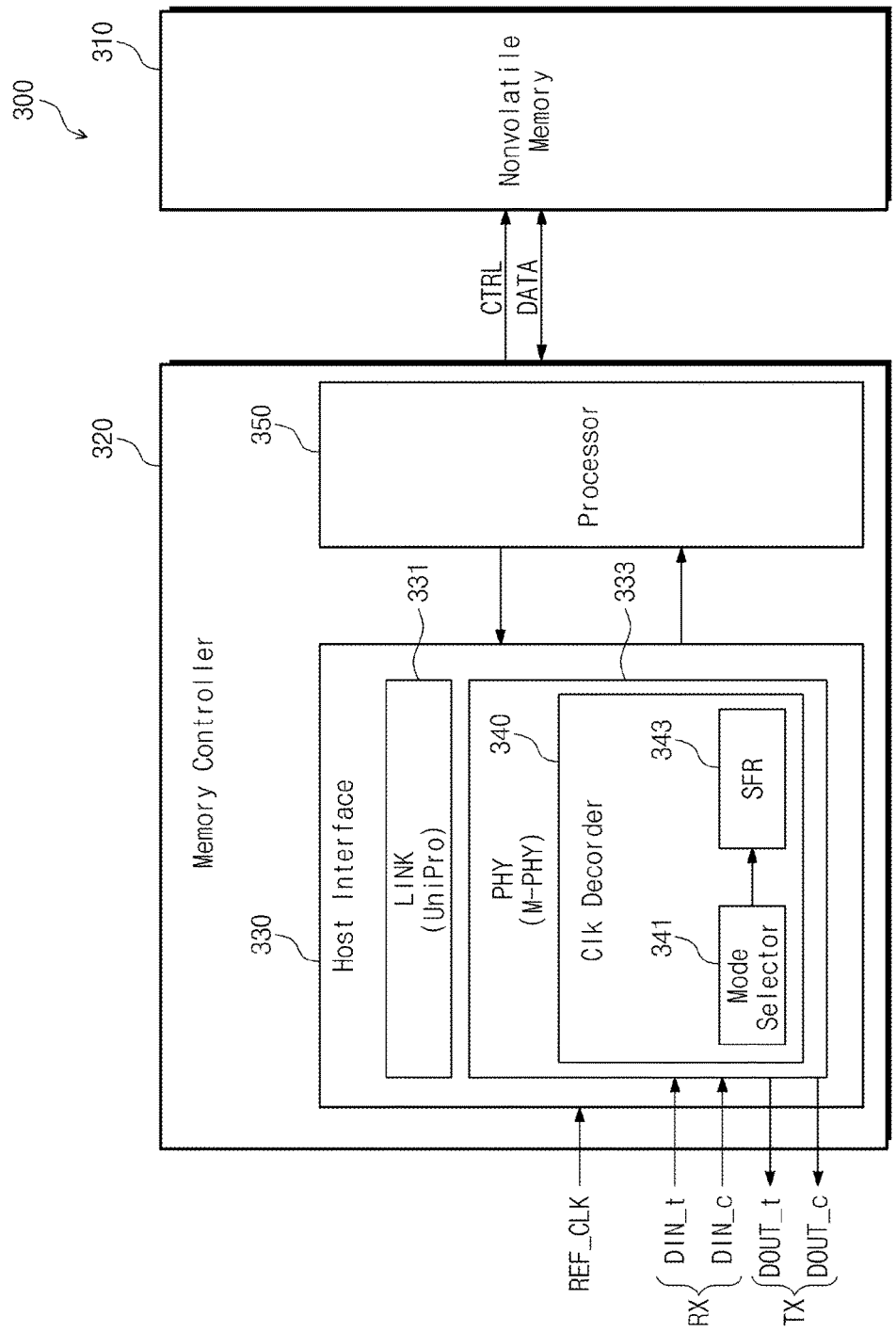
FIG. 9 is a block diagram schematically illustrating a storage device according to at least one example embodiment of inventive concepts.

FIG. 9 is a block diagram schematically illustrating a storage device 300 according to at least one example embodiment of inventive concepts. Referring to FIG. 9, a storage device 300 contains a nonvolatile memory 310 and a memory controller 320. The memory controller 320 includes a host interface 330 and a processor 350. The host interface 330 incorporates a link layer 331 and a physical layer 333.

The storage device 300 of FIG. 9 differs from that 200 of FIG. 2 in that the physical layer 33 contains a clock decoder 340. The clock decoder 340 is not formed separately from the host interface 330, but it is formed together with the physical layer 333.

Figure 10:
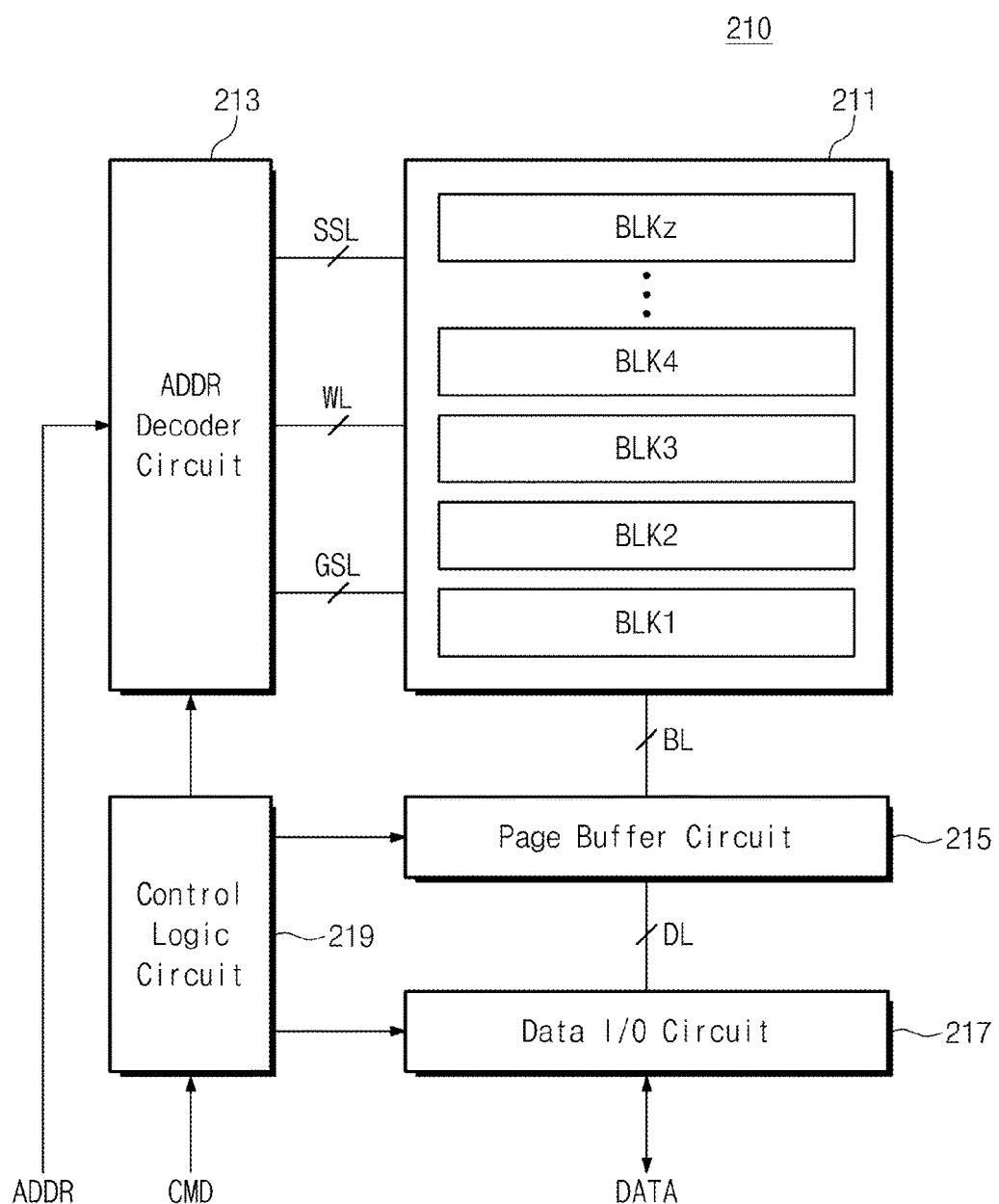
FIG. 10 is a block diagram schematically illustrating a nonvolatile memory of a storage device 200 shown in FIG. 2, according to at least one example embodiment of inventive concepts.

FIG. 10 is a block diagram schematically illustrating a nonvolatile memory 210 of a storage device 200 shown in FIG. 2, according to at least one example embodiment of inventive concepts. Referring to FIG. 10, a nonvolatile memory 210 includes a memory cell array 211, an address decoder circuit 213, a page buffer circuit 215, a data input/output circuit 217, and a control logic circuit 219.

The memory cell array 211 includes a plurality of memory blocks BLK1 through BLKz, each of which has a plurality of memory cells. Each memory block is connected to the address decoder circuit 213 through at least one string selection line SSL, a plurality of word lines WL, and at least one ground selection line GSL. Each memory block is connected to the page buffer circuit 215 through a plurality of bit lines BL. The memory blocks BLK1 through BLKz may be connected in common to the plurality of bit lines BL. Memory cells of the memory blocks BLK1 through BLKz may have the same structure.

The address decoder circuit 213 is connected to the memory cell array 211 through a plurality of ground selection lines GSL, the plurality of word lines WL, and a plurality of string selection lines SSL. The address decoder circuit 213 operates in response to a control of the control logic circuit 219. The address decoder circuit 213 receives an address ADDR from a memory controller 220 (refer to FIG. 2). The address decoder circuit 213 decodes the address ADDR and controls voltages to be applied to the word lines WL according to the decoded address. For example, upon programming, the address decoder circuit 213 applies a pass voltage to word lines. Upon programming, the address decoder circuit 213 applies a program voltage to a word line, which the address ADDR points out, from among the word lines.

The page buffer circuit 215 is connected to the memory cell array 211 through the bit lines BL. The page buffer circuit 215 is connected to the data input/output circuit 217 through a plurality of data lines DL. The page buffer circuit 215 operates in response to a control of the control logic circuit 219.

The page buffer circuit 215 holds data to be programmed at memory cells of the memory cell array 211 or data read from memory cells thereof. During a program operation, the page buffer circuit 215 stores data to be stored in memory cells. The page buffer circuit 215 biases the plurality of bit lines BL, based on the stored data. The page buffer circuit 215 functions as a write driver at a program operation. During a read operation, the page buffer circuit 215 senses voltages of the bit lines BL and stores the sensed results. The page buffer circuit 215 functions as a sense amplifier at a read operation.

The data input/output circuit 217 is connected to the page buffer circuit 215 through the data lines DL. The data input/output circuit 217 exchanges data with the memory controller 220.

The data input/output circuit 217 temporarily stores data the memory controller 220 provides, and it transfers the temporarily stored data to the page buffer circuit 215. The data input/output circuit 217 temporarily stores data transferred from the page buffer circuit 215 and transfers it to the memory controller 220. The data input/output circuit 217 functions as a buffer memory.

The control logic circuit 219 receives a command CMD from the memory controller 220. The control logic circuit 219 decodes the command CMD thus received and controls an overall operation of the nonvolatile memory 210 according to the decoded command. The control logic circuit 219 may further receive control signals from the memory controller 220.

Figure 11:
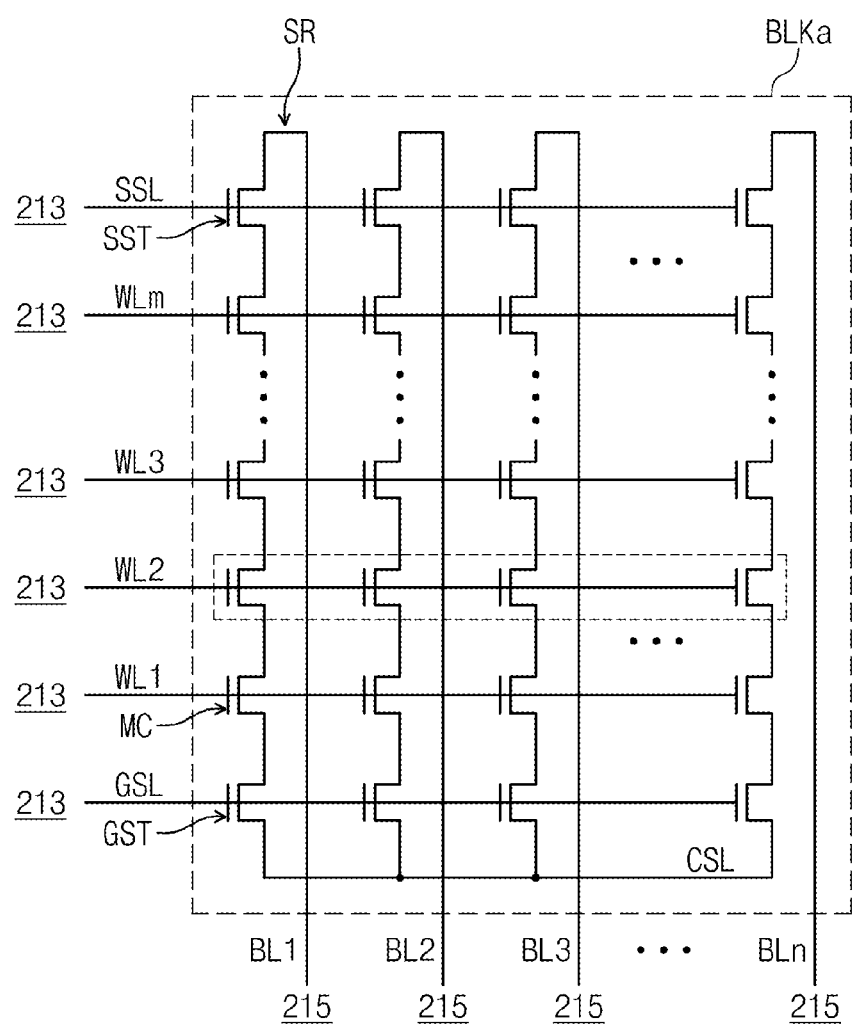
FIG. 11 is a circuit diagram schematically illustrating a memory block of a nonvolatile memory 210 shown in FIG. 10, according to at least one example embodiment of inventive concepts.

FIG. 11 is a circuit diagram schematically illustrating a memory block BLKa of a nonvolatile memory 210 shown in FIG. 10, according to at least one example embodiment of inventive concepts. FIG. 11 illustrates one BLKa of a plurality of memory blocks BLK1 through BLKz of a memory cell array 211 shown in FIG. 10.

Referring to FIGS. 10 and 11, a memory block BLKa includes a plurality of strings SR, which are connected to a plurality of bit lines BL1 through BLn, respectively. Each string SR contains a ground selection transistor GST, memory cells MC, and a string selection transistor SST.

In each string SR, the ground selection transistor GST is connected between the memory cells MC and a common source line CSL. The ground selection transistors GST of the strings SR are connected in common to the common source line CSL.

In each string SR, the string selection transistor SST is connected between the memory cells MC and a bit line BL. The string selection transistors SST of the strings SR are connected to a plurality of bit lines BL1 through BLn, respectively. The bit lines BL1 through BLn may be connected to a page buffer circuit 215.

In each string SR, the plurality of memory cells MC are connected between the ground selection transistor GST and the string selection transistor SST. In each string SR, the plurality of memory cells MC are connected in series.

In the strings SR, memory cells MC having the same height from the common source line CSL are connected in common to a word line. The memory cells MC of the strings SR are connected to a plurality of word lines WL1 through WLm. The word lines WL1 through WLm may be connected to an address decoder circuit 213.

Figure 12:
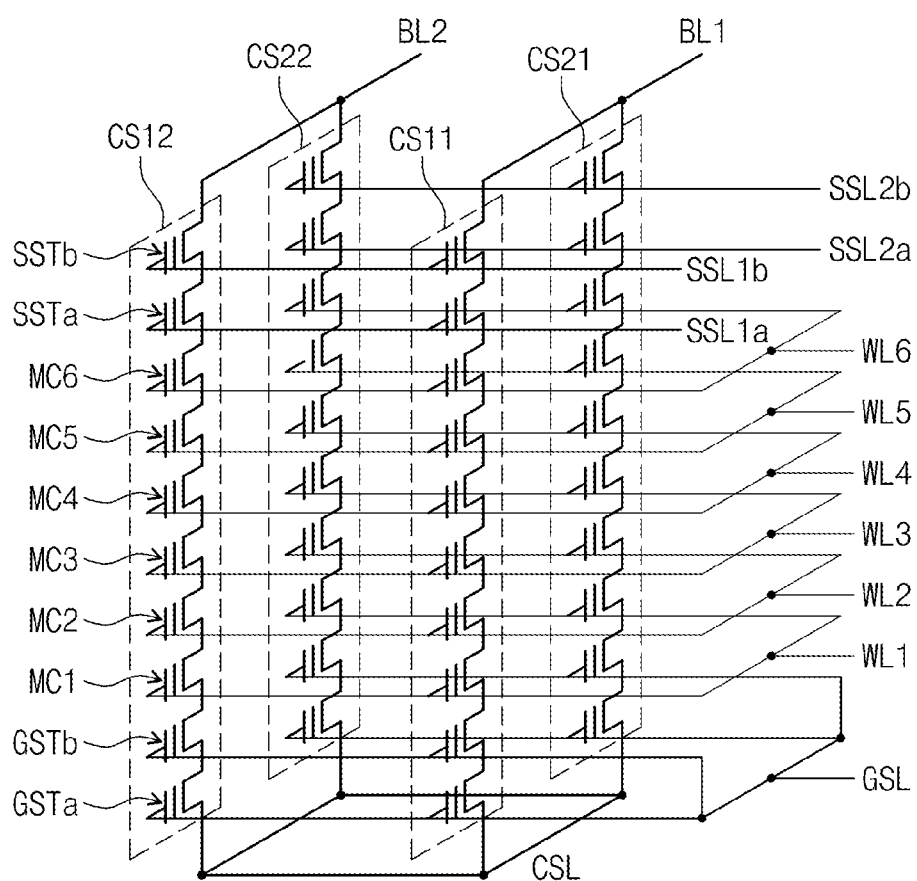
FIG. 12 is a circuit diagram schematically illustrating a memory block of a nonvolatile memory shown in FIG. 10, according to at least one example embodiment of inventive concepts.

FIG. 12 is a circuit diagram schematically illustrating a memory block BLKb of a nonvolatile memory 210 shown in FIG. 10, according to at least one example embodiment of inventive concepts. Referring to FIG. 12, a memory block BLKb includes a plurality of cell strings CS11 through CS21 and CS12 through CS22. The plurality of cell strings CS11 through CS21 and CS12 through CS22 are arranged along a row direction and a column direction and form rows and columns.

For example, the cell strings CS11 and CS12 arranged along the row direction form a first row, and the cell strings CS21 and CS22 arranged along the row direction form a second row. The cell strings CS11 and CS21 arranged along the column direction form a first column, and the cell strings CS12 and CS22 arranged along the column direction form a second column.

Each cell string contains a plurality of cell transistors. The cell transistors include ground selection transistors GSTa and GSTb, memory cells MC1 through MC6, and string selection transistors SSTa and SSTb. The ground selection transistors GSTa and GSTb, memory cells MC1 through MC6, and string selection transistors SSTa and SSTb of each cell string are stacked in a height direction perpendicular to a plane (e.g., plane above a substrate of the memory block BLKa) on which the cell strings CS11 through CS21 and CS12 through CS22 are arranged along rows and columns.

Lowermost ground selection transistors GSTa are connected in common to a common source line CSL.

The ground selection transistors GSTa and GSTb of the plurality of cell strings CS11 through CS21 and CS12 through CS22 are connected in common to a ground selection line GSL.

In at least one example embodiment of inventive concepts, ground selection transistors with the same height (or, order) may be connected to the same ground selection line, and ground selection transistors with different heights (or, orders) may be connected to different ground selection lines. For example, the ground selection transistors GSTa with a first height are connected in common to a first ground selection line, and the ground selection transistors GSTb with a second height are connected in common to a second ground selection line.

In at least one example embodiment of inventive concepts, ground selection transistors in the same row may be connected to the same ground selection line, and ground selection transistors in different rows may be connected to different ground selection lines. For example, the ground selection transistors GSTa and GSTb of the cell strings CS11 and CS12 in the first row are connected in common to the first ground selection line and the ground selection transistors GSTa and GSTb of the cell strings CS21 and CS22 in the second row are connected in common to the second ground selection line.

Connected in common to a word line are memory cells that are placed at the same height (or, order) from the substrate (or, the ground selection transistors GST). Connected to different word lines WL1 through WL6 are memory cells that are placed at different heights (or, orders). For example, the memory cells MC1 are connected in common to the word line WL1, the memory cells MC2 are connected in common to the word line WL2, and the memory cells MC3 are connected in common to the word line WL3. The memory cells MC4 are connected in common to the word line WL4, the memory cells MC5 are connected in common to the word line WL5, and the memory cells MC6 are connected in common to the word line WL6.

In first string selection transistors SSTa, having the same height (or order), of the cell strings CS11 through CS21 and CS12 through CS22, the first string selection transistors SSTa in different rows are connected to different string selection lines SSL1a and SSL2a. For example, the first string selection transistors SSTa of the cell strings CS11 and CS12 are connected in common to the string selection line SSL1a, and the first string selection transistors SSTa of the cell strings CS21 and CS22 are connected in common to the string selection line SSL2a.

In second string selection transistors SSTb, having the same height (or, order), of the cell strings CS11 through CS21 and CS12 through CS22, the second string selection transistors SSTb in different rows are connected to the different string selection lines SSL1a and SSL2a. For example, the second string selection transistors SSTb of the cell strings CS11 and CS12 are connected in common to the string selection line SSL1b, and the second string selection transistors SSTb of the cell strings CS21 and CS22 are connected in common to the string selection line SSL2b.

That is, cell strings in different rows may be connected to different string selection lines. String selection transistors, having the same height (or order), of cell strings in the same row may be connected to the same string selection line. String selection transistors, having different heights (or orders), of cell strings in the same row may be connected to different string selection lines.

In exemplary embodiments, string selection transistors of cell strings in the same row may be connected in common to a string selection line. For example, string selection transistors SSTa and SSTb of cell strings CS11 and CS12 in the first row are connected in common to a string selection line, and string selection transistors SSTa and SSTb of cell strings CS21 and CS22 in the second row are connected in common to a string selection line.

Columns of the cell strings CS11 through CS21 and CS12 through CS22 are connected to different bit lines BL1 and BL2, respectively. For example, string selection transistors SSTb of the cell strings CS11 and CS21 in the first column are connected in common to the bit line BL1, and string selection transistors SSTb of the cell strings CS12 and CS22 in the second column are connected in common to the bit line BL2.

The memory block BLKa shown in FIG. 12 is an example. However, the scope and spirit of inventive concepts are not limited thereto. For example, the number of rows of cell strings may increase or decrease. If the number of rows of cell strings is changed, the number of string or ground selection lines and the number of cell strings connected to a bit line may also be changed.

The number of columns of cell strings may increase or decrease. If the number of columns of cell strings is changed, the number of bit lines connected to columns of cell strings and the number of cell strings connected to a string selection line may also be changed.

A height of the cell strings may increase or decrease. For example, the number of ground selection transistors, memory cells, or string selection transistors that are stacked in each cell string may increase or decrease.

In at least one example embodiment of inventive concepts, writing and reading may be made by the row of cell strings. Cell strings CS11 through CS21 and CS12 through CS22 may be selected by the row by controlling the string selection lines SSL1a, SSL1b, SSL2a, and SSL2b.

In a selected row of cell strings, writing and reading may be made by the word line. In a selected row of cell strings, memory cells connected to a selected word line may be programmed.

Figure 13:
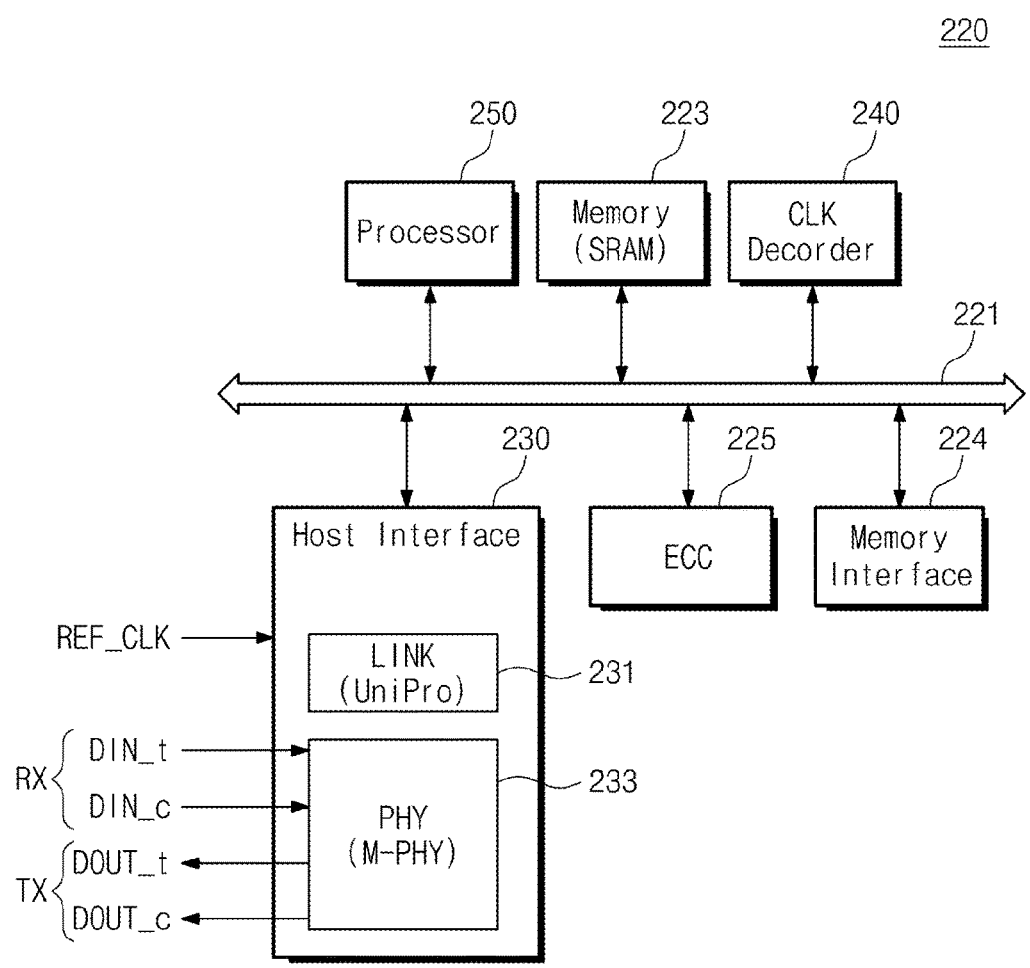
FIG. 13 is a block diagram schematically illustrating a memory controller according to at least one example embodiment of inventive concepts.

FIG. 13 is a block diagram schematically illustrating a memory controller 220 according to at least one example embodiment of inventive concepts. Referring to FIG. 13, a memory controller 220 contains a bus 121, a processor 250, a memory 223, an ECC block 225, a host interface 230, an ECC block 225, and a memory interface 224.

The bus 121 may be configured to provide a channel among components of the memory controller 220.

The processor 250 controls an overall operation of the memory controller 220 and executes a logical operation. The processor 250 communicates with a host device, which supports a first protocol, through the host interface 230 in a first mode. The processor 122 also communicates with a host device 100, which does not support the first protocol, in a second mode. The processor 250 communicates with a nonvolatile memory 210 (refer to FIG. 2) through the memory interface 224.

The memory 223 is used as a working memory, a cache memory, or a buffer memory of the processor 250. The memory 223 stores codes or instructions that the processor 250 will execute. The memory 223 stores data processed by the processor 250. The memory 223 may include an SRAM.

The memory interface 224 performs communications with the nonvolatile memory 210 in response to a control of the processor 250.

The ECC block 225 performs an error correction operation. The ECC block 225 generates parity for error correction, based on data to be written at the nonvolatile memory 210. The data and parity may be output to the nonvolatile memory 210 through the memory interface 224. The ECC block 225 corrects an error of data by means of data and parity that are read from the nonvolatile memory 10 through the memory interface 224.

The host interface 230 conducts first protocol-based communications with an external host device under a control of the processor 250. The host interface 230 may include a host interface 230 described with reference to FIG. 2.

Figure 14:
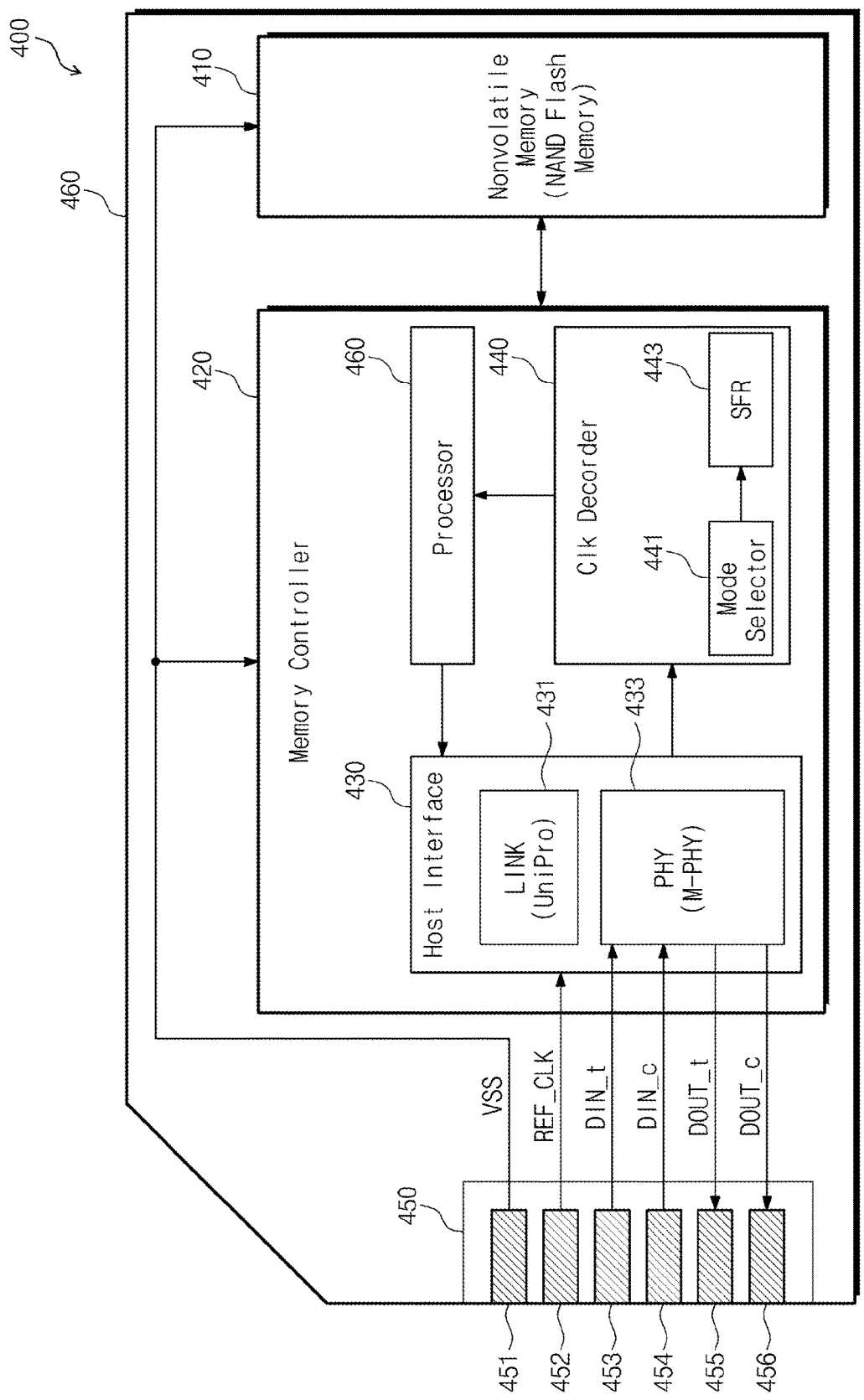
FIG. 14 is a block diagram schematically illustrating a memory card according to at least one example embodiment of inventive concepts.

FIG. 14 is a block diagram schematically illustrating a memory card 400 according to at least one example embodiment of inventive concepts. A storage device 200 shown in FIG. 2 may be used to implement a memory card.

Referring to FIG. 14, a memory card 400 contains a nonvolatile memory 410, a memory controller 420, a connector 450, and a body 460. The memory controller 420 contains a host interface 430, a clock decoder 440, and a processor 460.

The nonvolatile memory 410 and the memory controller 420 shown in FIG. 14 are substantially the same as a nonvolatile memory 210 and a memory controller 220 shown in FIG. 2, and a description thereof is thus omitted.

The connector 450 is configured to connect with a host device 100 (refer to FIG. 1) detachably. The connector 450 contains a plurality of connection pads 451 through 456.

The first connection pad 451 is supplied with a ground voltage VSS from the host device 100. The first connection pad 451 supplies a ground voltage VSS from an external host device 100 to the nonvolatile memory 410 and the memory controller 420.

The second connection pad 452 provides a clock terminal REF_CLK of the memory controller 420 with a reference clock supplied from a host device that supports a first protocol. The second connection pad 452 provides the clock terminal REF_CLK of the memory controller 420 with a second protocol-based signal supplied from a host device 100 that does not support the first protocol.

The third and fourth connection pads 453 and 454 transfer signals received from the host device 100 to first and second input terminals DIN_t and DIN_c of the memory controller 420.

The fifth and sixth connection pads 455 and 456 provides the external host device 100 with signals transmitted from first and second output terminals DOUT_t and DOUT_c of the memory controller 420.

The memory card 400 does not include a separate connection pad for communicating with the host device 100, which does not support the first protocol, other than the first through sixth connection pads 451 through 456. The memory card 400 receives a second protocol-based signal from the host device 100 through the second connection pad 452 and outputs a second protocol-based signal to the host device 100 through one of the fifth and sixth pads 455 and 456. The memory card 400 conducts second protocol-based communications with the host device 100, which does not support the first protocol, without a separate connection pad for the second protocol-based communications.

The body 460 covers components of the memory card 400 and physically protects the memory card 400.

The memory card 400 shown in FIG. 14 may be a compact flash card (CFC), a Microdrive, a smart media card (SMC), a multimedia card (MMC), a security digital card (SDC), a memory stick, or a USB flash memory driver.

While inventive concepts have been described with reference to example embodiments, it will be apparent to those skilled in the art that various changes and modifications may be made without departing from the spirit and scope of inventive concepts. Therefore, it should be understood that the above example embodiments are not limiting, but illustrative.

What is claimed is:

1. A storage device, comprising:
a host interface configured to communicate with a host device according to a first protocol through,
an input terminal configured to receive an input signal from the host device according to the first protocol,
an output terminal configured to output an output signal to the host device according to the first protocol, and
a clock terminal configured to receive a clock signal from the host device according to the first protocol,
wherein the host interface is configured to communicate with the host device according to a second protocol through the clock terminal, the second protocol being different from the first protocol;
wherein the host interface is further configured to receive a clock signal that is based on the second protocol through the clock terminal and output an output signal that is based on the second protocol through the output terminal; and
a clock decoder configured to analyze at least one command set of the clock signal that is based on the second protocol to identify a clock mode of a segment.

2. The storage device of claim 1, wherein the first protocol is a Universal Flash Storage (UFS) protocol.

3. The storage device of claim 1, wherein the host interface is configured to communicate with the host device according to the first protocol in a first mode, and
communicate with the host device according to the second protocol in a second mode.

4. The storage device of claim 3, wherein in the second mode, the clock signal is based on the second protocol.

5. The storage device of claim 1, wherein the input terminal is deactivated in the second mode.

6. The storage device of claim 1, wherein the segment includes a plurality of pulses, and
wherein the clock decoder is configured to determine a length of the segment and the clock mode based on pulse widths of the pulses.

7. The storage device of claim 1, wherein the clock mode includes:
a first clock mode associated with a command informing an entry into the second mode;
a second clock mode corresponding to a first bit of a code indicating an operation to be executed in the second mode;
a third clock mode corresponding to a second bit of the code different from the first bit; and
a fourth clock mode associated with a command directing execution of the operation indicated by the code.

8. The storage device of claim 1, wherein after entering the second mode, the host interface is configured to set the output terminal to a hibernate state until the operation is executed; and
wherein after the operation is executed, the host interface is configured to control the output terminal to maintain the hibernate state or have one of a positive state and a negative state depending on a result of the execution.

9. The storage device of claim 8, wherein the host interface is configured to pull-up the output terminal in the hibernate state.

10. The storage device of claim 8, wherein the output terminal includes a first output terminal and a second output terminal which output complementary signals, and
wherein if the output terminal is controlled to have the positive state or the negative state, the host interface is configured to perform second protocol-based communications through whichever one of the first output terminal and the second output terminal has a low state.

11. The storage device of claim 1, wherein the host interface includes a physical layer having the clock decoder.

12. The storage device of claim 1, wherein the storage device is implemented as a memory card.

13. A memory card, comprising:
a nonvolatile memory; and
a memory controller configured to control the nonvolatile memory by operating in a first mode or a second mode, the first mode being a mode in which communications with a host device supporting a first protocol are made in compliance with the first protocol, the second mode being a mode in which communications with a host device not supporting the first protocol are made in compliance with a second protocol, different from the first protocol, wherein the memory controller includes,
- a host interface configured to perform first protocol-based communications,
- an output terminal configured to output an output signal based on the second protocol in the second mode,
- a clock terminal configured to receive a clock signal that is based on the second protocol in the second mode, and
- a clock decoder configured to analyze at least one command set of the clock signal that is based on the second protocol to identify a clock mode of a segment.

14. The memory card of claim 13, wherein the memory controller further comprises an input terminal that is deactivated in the second mode.

15. The memory card of claim 13, wherein the nonvolatile memory is a flash memory including a three dimensional memory array.

16. A storage device, comprising:
a memory controller including an input terminal and a clock terminal, the memory controller being configured to operate in one of a first mode and a second mode based on a communication protocol of the host device, the first mode being a mode in which the memory controller receives first commands from the host device through an input signal at the input terminal according to a first communication protocol, the second mode being a mode in which the memory controller receives second commands from the host device through a clock signal at the clock terminal according to a second communication protocol, different from the first communication protocol;

the memory controller further including a decoder configured to, in the second mode, determine the second commands by analyzing pulse widths of pulses in a segment of the clock signal.

17. The storage device of claim 16, wherein the memory controller is configured to enter the first mode if the communication protocol of the host device is the first communication protocol, and enter the second mode if the communication protocol of the host device is the second protocol.

18. The storage device of claim 16, wherein the pulse widths indicate a plurality of clock modes, the clock modes including,
- a first clock mode associated with a command informing an entry into the second mode,
- a second clock mode corresponding to a first bit of a code indicating an operation to be executed in the second mode,
- a third clock mode corresponding to a second bit of the code different from the first bit, and
- a fourth clock mode associated with a command directing execution of the operation indicated by the code.

* * * * *